United States Patent [19]

Beard

[11] Patent Number: 4,814,885
[45] Date of Patent: Mar. 21, 1989

[54] COMPRESSIVE FILM TO VIDEO TRANSFER METHOD

[76] Inventor: Terry D. Beard, 1407 N. View Dr., Westlake Village, Calif. 91362

[21] Appl. No.: 150,073

[22] Filed: Jan. 29, 1988

[51] Int. Cl.[4] .......................... H04N 3/36; H04N 5/253
[52] U.S. Cl. ........................................ 358/214; 358/216
[58] Field of Search ................................ 358/214–216, 358/54

[56] References Cited
U.S. PATENT DOCUMENTS

| 2,517,797 | 8/1950 | McFarlane | 358/214 |
| 2,590,281 | 3/1952 | Sziklai et al. | 358/214 |
| 4,127,869 | 11/1978 | Millward | 358/214 |
| 4,338,634 | 7/1982 | Dillon et al. | 358/214 |

Primary Examiner—Jin F. Ng
Assistant Examiner—Stephen Brinich
Attorney, Agent, or Firm—Koppel & Jacobs

[57] ABSTRACT

An improved method is disclosed for transferring motion pictures from film to videotape, with an improved video image quality for moving objects. In the preferred embodiment, the motion picture is filmed at twice the video frame rate, and alternating scanning fields from each pair of film frames are transferred to interleaved fields on a single video frame. The method substantially eliminates image jitter of moving objects, and is particularly adapted to a new 3-D television technique. Various alternate transfer systems are described, as well as a generalization of the invention to account for different film speeds or numbers of fields per frame.

10 Claims, 5 Drawing Sheets

COMPRESSIVE FILM TO VIDEO TRANSFER METHOD

BACKGROUND OF THE INVENTION

1. Field of the Invention

This invention relates to a method for transferring motion picture images onto a videotape, and more particularly for film to video transfer methods adapted for 3-D television viewing.

2. Description of the Related Art

A new technique for achieving 3-D televisions described in U.S. Pat. No. 4,705,371 to the present inventor. This technique produces a very noticeable 3-D effect by combining a particular type of viewer glasses with a specific filming technique. A moving picture of a scene is recorded such that a relative lateral movement is created between the scene and the recording mechanism. The lateral movement can result from movement within the scene itself, or by moving the camera in various ways. The recorded scene is then viewed through a pair of glasses in which one lens has a greater optical density that the other lens, with the darker lens having a substantially higher transmissivity in the blue region than in the green or yellow regions. The optical density of the darker lens may also be reduced, by increasing its transmissivity, in the red region.

Since this technique avoids the double image inherent in other 3-D television approaches, it has the distinct advantage of presenting a picture which appears to be perfectly clear and natural to an audience which does not have viewer glasses, and yet has a very noticeable 3-D effect when the glasses are worn. However, an optimum picture is not produced when this technique is used in connection with standard film to video transfer techniques.

Moving picture are recorded on silver halide based motion picture film as a sequence of still photographs. Normally 24 or 30 such still photographs or frames per second are recorded to make a motion picture. 24 frames per second has become the standard frame rate for modern motion pictures, and 25 and 30 frames per second have become the standard frame rates for television. Higher frame rates are sometimes used in filming motion pictures, but this is typically for the purpose of achieving a "slow motion" effect.

30 frame television presents 30 complete images per second on the television screen. Each video frame comprises two interleaved fields, with a new field presented each 60th of a second. A motion picture film recorded at 30 frames per second is conventionally transferred to 30 frame per second video by scanning the two interleaved fields of the first video frame from the first film frame. The next two interleaved fields comprising the second video frame are scanned from the second film frame, and so on. To transfer a 24 frame per second film to 30 frame per second video, the first two video fields are scanned from the first film frame, the next three video fields from the second film frame, the next two video fields from the third field frame, and so on.

Television producers often prefer to shoot a program with motion picture film and then transfer the film to videotape, rather than using videotape in the original shoot, because of the much greater dynamic range of motion picture film compared to video cameras. However, when a film to videotape transfer is done and the results viewed through the 3-D viewer glasses disclosed in U.S. Pat. No. 4,705,371, the video images of moving objects appear to jump in steps across the screen as they move. The result is a poor video image quality for moving objects when conventional film to video transfer techniques are used.

SUMMARY OF THE INVENTION

In view of the above problems, the object of the present invention is to provide a film to video transfer method which substantially eliminates the jitter observed with the new 3-D television method.

To accomplish this object, a motion picture film is organized into a plurality of successive film units, each unit including a plurality of successive image frames. A first field of lines is scanned within one frame of each film unit, and at least one additional field of lines is scanned from at least one other frame of each film unit, the additional field of lines being positionally interleaved with respect to the first field. The line scans are then encoded into a video format, and recorded onto videotape. The encoder line scans of each successive film unit are recorded onto a single videotape frame for each film unit, with the encoded field lines of each film unit interleaved on their respective videotape frame in a manner which corresponds to the interleaving of the line scans within the film unit. In this manner, a plurality of film frames are essentially compressed into a single video frame, resulting in a videotape which appears smooth and regular when played back and viewed through the 3-D glasses.

In the preferred embodiment, each film unit comprises a pair of image frames, with each frame consisting of interleaved odd and even scan lines. The odd lines of one frame and the even lines of the other frame are scanned and combined into a single frame of videotape. The scanning is performed at a scanning station, and the motion picture film is advanced past the scanning station at a rate which is coordinated with the scanning so that every other line on each motion picture frame is scanned. The scanned and encoded fields of motion picture lines may be recorded directly onto videotape, without any intermediate accumulative storage of successive fields. Alternately, the scans for a relatively large number of film frames may be accumulated in a storage device, with the desired scans for transfer onto videotape read out from the storage device, encoded into video format, and recorded on their respective videotape frames. In either case, a normal playback is obtained by recording the original movie film at twice the normal rate of speed.

These and other features and advantage of the invention will be apparent to those skilled in the art from the following detailed description of preferred embodiment, taken together with the accompanying drawings, in which:

DETAILED DESCRIPTION OF PREFERRED EMBODIMENTS

Figure 1:
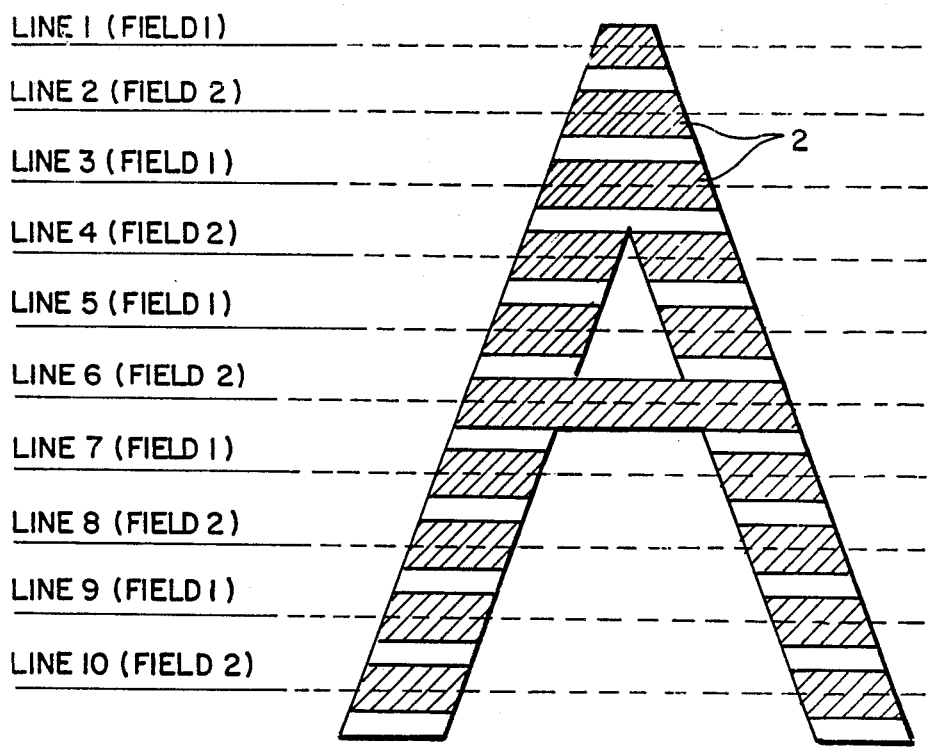
FIG. 1 is a diagram of the letter A divided into fields of video scan lines.

The basic film to video transfer process of the present invention is best understood by referring to FIG. 1. This represents the upper left hand corner of a television display in which a dark capital letter A is presented against a bright background. A close inspection of the television screen will reveal that the letter is not actually solid, but rather is composed of a series of horizontal scan lines which are modulated ON and OFF to form the desired image. Although ten lines are shown in the figure for simplicity, current conventional television images comprise over 500 lines, and future high definition television images are expected to comprise over 1,000 lines. The darker areas of the lines 2 represent areas where the television CRT electron beam has been turned off, with the result that no light comes from the television screen in these areas.

The lines are divided into two filed, one of odd numbered lines and the other of even numbered lines. With conventional interleaved video, the filed of odd numbered lines is first scanned across the screen, followed by the file do interleaved even numbered lines. The scanning is performed rapidly enough, typically at a rate of 30 frames (60 fields) per second, so that the viewer perceives a continuous and complete image.

Figure 2:
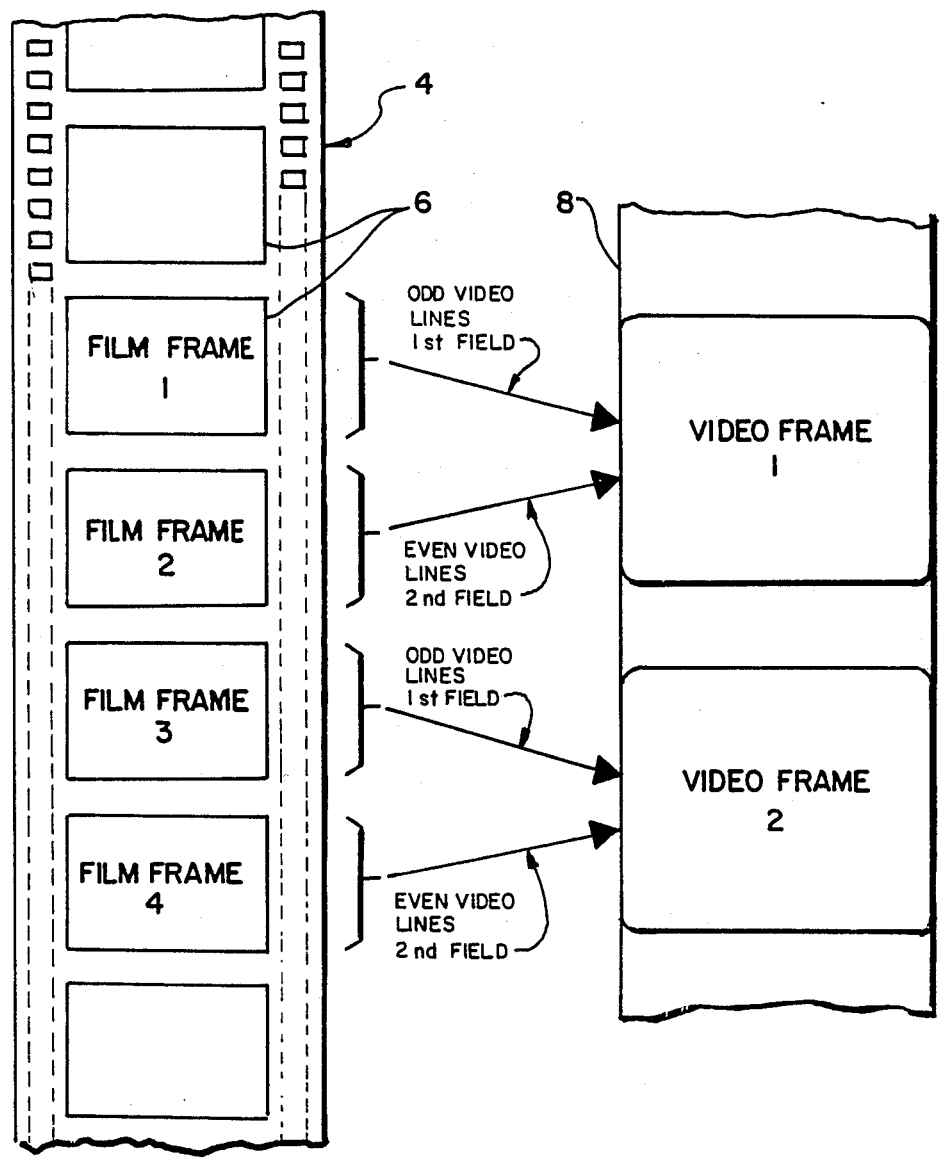
FIG. 2 is a block diagram illustrating the compression of two film frames to each video frame in accordance with the invention.

The manner in which the present invention transfers the images of a movie film onto videotape so as to substantially eliminate the image jumping and smearing problem encountered with the referenced 3-D method is illustrated in FIG. 2. A strip of movie film 4 is shown as consisting of a series of successive frames 6, each presenting a still image. The film is organized into successive film units of two frames each, the first film unit consisting of the frames numbered 1 and 2, the second film unit of frames 3 and 4, etc. Each of the film units is transferred onto a single corresponding frame of a videotape 8. The odd numbered lines of the first frame within each film unit are used for the first field of lines within the corresponding video frame, while the even numbered lines from the second frame within each film unit are used for the second field of lines in the corresponding video frame, the first and second video fields being interleaved with each other. In this manner two film frames are "compressed" onto each video frame. This has been found to substantially eliminate the image jumping problem referred to above when the videotape is played back at standard speed. The film is initially shot at 60 frames per second, which is twice the normal speed, so that the videotape presents a normal speed image when played back.

Although the video frames in FIG. 2 are illustrated in a manner similar to the film frames for simplicity, standard videotape is typically recorded as a series of helical scan lines at a small angel to the edge of the tape. However, since markers such as vertical retrace pulses are included in the videotape to indicate the end of one motion picture frame and the beginning of the next, it is conceptually accurate to visualize the videotape being divided into successive frames in a manner similar to the motion picture film.

The conventional method used to transfer film to video involves the scanning of a single spot of light horizontally across the motion picture film, while advancing the film continuously in a direction perpendicular to the scan line. The film speed and the vertical displacement of the light spot are adjusted so that it advances by exactly one line during each line scan. The light from the flying spot that passes through the film is then detected by photodetectors which measure the amount of red, green and blue light which passes through the film. The flying spot can be obtained from a spot on a cathode ray tube, or from a three color laser using electro-optic or electromechanical scanning. With conventional interleaved field transfer techniques, such a flying spot telecine requires the scanned information to be stored in a "frame store" to allow the two interleaved fields to be transferred to videotape in sequence, since the odd numbered lines must first be transferred onto the first video field, and the even numbered lines must then be transferred onto the second video field. The CINTEL TM telecine by Rank Corp. is one device that can be used for this purpose.

Figure 3:
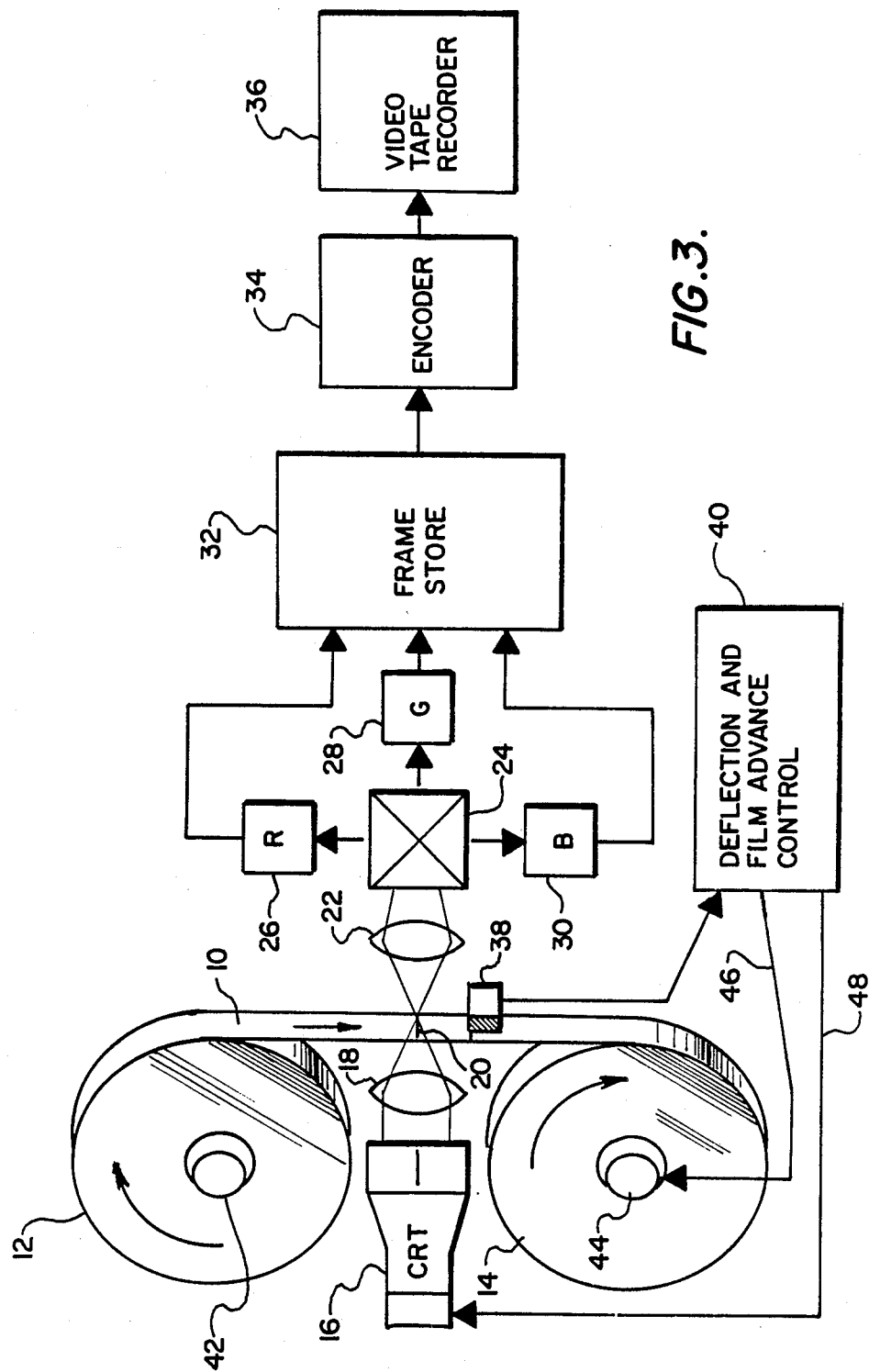
FIG. 3 is a block diagram of an embodiment that employs a frame storage mechanism to accomplish the invention.

FIG. 3 is a block diagram showing the application of this conventional approach to the present invention. The movie film 10 is moved from a supply reel 12 onto a takeup reel 14 at a fixed speed, typically 30 frames per second. Light from a flying spot scanning CRT 16 is imaged by lens assembly 18 onto the film and scanned across it in a horizontal line 20. Light passing through the film is collected by lens assembly 22 and focused through a dichroic beam splitter 24 onto red, green and blue photodetectors 26, 28 and 30, respectively. The signals from the photodetectors are digitized and stored in a standard frame store 32, which is read out in an interleaved mode by video encoder 34. The encoder transforms the film scans into video format and delivers them to a videotape recorder 36, which records them onto videotape. The encoder 34 is programmed to interleave the odd scan lines for every other film frame with the even scan lines for the intervening frame, as described above. A film position detector 38 relays the relative film position to a CRT deflection and film advance control circuit 40, which controls film motion motors 42 and 44 and the deflector for CRT 16 via control lines 46 and 48.

In accordance with the present invention, a significantly simpler method can be used to accomplish the interleaving of film frames on the videotape. This involves simply increasing the motion picture film speed so that the film advances two line widths in the time taken to scan a single line. In this manner only the odd numbered lines are scanned from the first frame of the film while only the even numbered lines are scanned from the second frame of the film. With this approach, no video frame store is required to use the current flying spot scanning technology. In some circumstances it may be desirable to use a short video time base correcting systems such as a first-in, first-out (FIFO) delay line, to properly set the time base of the scanned signals for the interleaved fields. Alternately, minor vertical deflections of the flying scanning spot may be used to effect a simple interleave of the scans.

Figure 4:
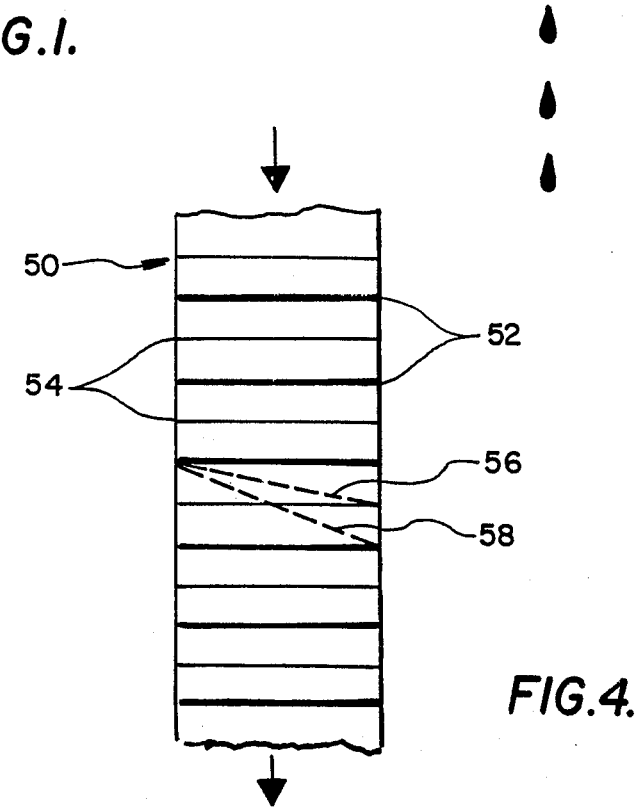
FIG. 4 is a simplified elevation view of a section of movie film, illustrating the coordination between the scan lines and the speed of film transport for an embodiment that avoids the need for frame storage.

This approach is illustrated in FIG. 4. A section of movie film 50 is shown divided into alternating odd and even scan lines 52 and 54, corresponding to a normal film speed of 30 frames per second. The flying spot is actually set up so that it traverses along a locus 56, which is at a slight angle to the desired scan line (the angle is considerably exaggerated in FIG. 4 for purposes of illustration). The net effect of the film movement and the offset scanning angle is to produce a substantially transverse scanning along each line. At 30 frames per second, each of the odd and even lines will be scanned. However, if the film speed is increased to 60 frames per second and the scanning offset angle doubled to that shown by locus 58, only the odd lines will be scanned. This allows a consecutive field consisting of only odd (or only even) lines to be scanned per frame. If necessary, a slight vertical offset can be introduced into the beam scan at the end of each film frame to ensure that the scan lines alternate between odd and even for each successive frame.

Figure 5:
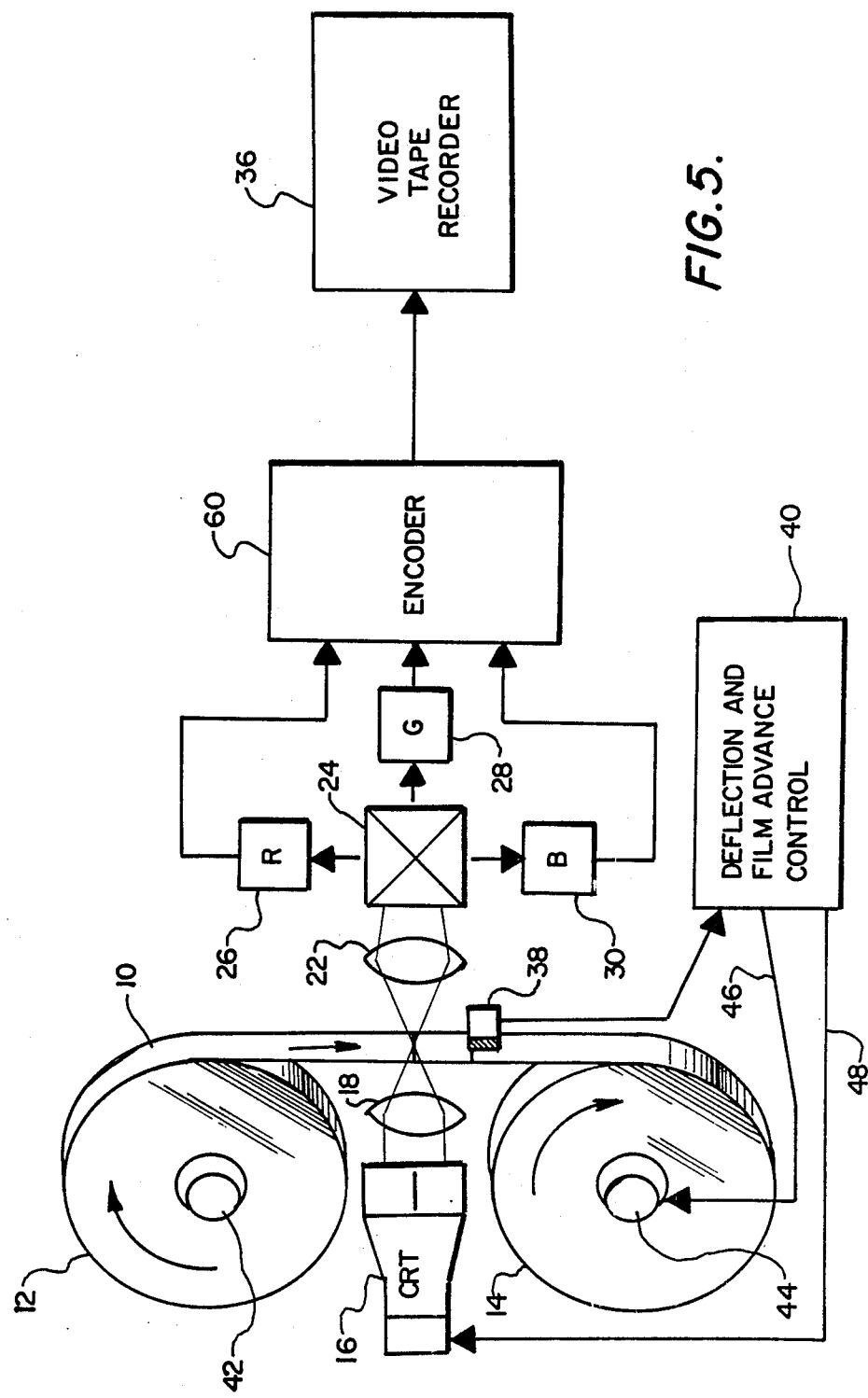
FIG. 5 is a block diagram of an embodiment that accomplishes a film to video transfer directly, without the use of a frame storage mechanism.

A system for implementing this improved approach is shown in block diagram form in FIG. 5. Most of the elements are the same as in FIG. 3, and are indicated by common reference numerals. The basic difference is that the takeup reel 14 is rotated at a 60 rather than 30 frame per second rate, the flying spot of CRT 16 moves at a correspondingly greater angle to the film (locus 58 in FIG. 4), and the frame store 32/encoder 34 combination of FIG. 3 is replaced by a single video encoder 60. The outputs of photodetectors 26, 28 and 30 are delivered directly and in real time to encoder 60, the output of which in turn is applied to videotape recorder 36. Encoder 60 is coordinated with recorder 36 so that the odd and even line fields from each successive pair of frames on the movie film are recorded in interleaved fashion on a single frame of the videotape.

The invention can also be implemented using current video tape editing methods and a conventional telecine transfer of the 60 frame per second movie film. One approach along this line would be to transfer the 60 frame per second film directly to a master videotape, as though it were a standard 30 frame per second film; if the master tape is then played back, the action would appear to take place at half speed. A programmed tape-to-tape field accurate dub is then performed from the master videotape to an object videotape. In this dub the first and second fields on the first frame of the object tape are taken respectively from the first field on the first frame and the second field of the second frame of the master tape, the first and second interleaved fields of the second object tape frame are taken from the first field of the third master frame and the second field of the fourth master frame, and so forth. This process is best accomplished with the use of an intermediate fast access disk-type video storage mechanism between the master and object videotapes.

Figure 6:
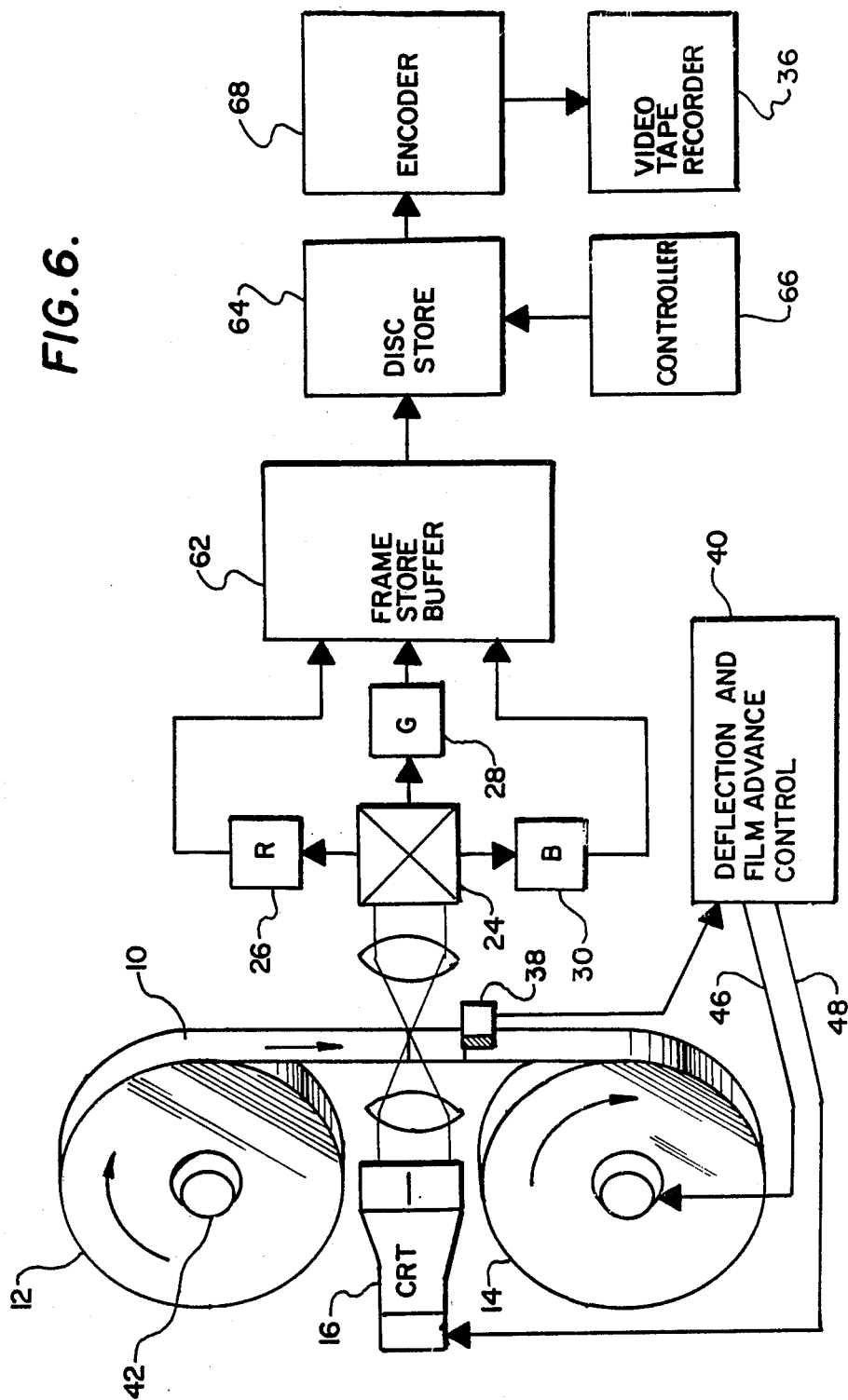
FIG. 6 is a block diagram of a system which accomplishes the invention with the use of an intermediate video disk storage device.

A more preferred approach which uses a disk storage mechanism is shown in FIG. 6. This system is essentially similar to that of FIG. 3 through the photodetectors 26, 28 and 30, and similar elements are again identified by common reference numerals. The outputs of the photodetectors are digitized and stored in a frame store buffer 62, which stores one full video frame of video data. The successive frames applied to frame store buffer 62 are read out as interleaved video fields into a large disk video storage mechanism 64, which can be provided with the Abekas Corp. A62 Video Disk Store, capable of storing many seconds of video data. Disk store 64 records both the odd an even fields of each film frame. A single field per film frame, alternating between odd and even for successive frames, is scanned out (as composite video in the case of the Abekas device) under the control of a controller 66 to an encoder 68, with each successive pair of odd and even frames interleaved into respective video frames. Encoder 68 then applies the video signal to the videotape recorder 36 for recording onto videotape.

The systems of FIGS. 3, 5 and 6 can be controlled to yield essentially the same videotape for a common input motion picture film. Other formats for the film-to-video transfer are also available. For example, instead of alternating between the odd and even fields for each successive frame of film every other film frame could be skipped entirely and the film speed doubled to compensate. Thus, the odd field from film frame 1 and the even field from film frame 3 could be interleaved onto the first videotape frame, the odd field from film frame 5 could be interleaved with the even field from film frame 7 for the second videotape frame, etc., with the film advanced at 120 frames per second. Other film-to-video transfer ratios could also be envisioned, although a two:one ratio is sufficient to substantially eliminate the image jump and smear problems noted above, and would generally be preferable.

Television systems with more than two interleaved frames might also appear at some time, and these could be accommodated in a similar fashion. The motion picture film would be conceptually organized into a plurality of successive film units, with each film unit consisting of a plurality of successive frames equal in number to the number of fields per frame. A first field of lines could be scanned within one frame of each film unit, and at least one additional field of lines which is positionally interleaved with respect to the first field would be scanned on at least one other frame within the film unit. The line scans would then be encoded into video format, and recorded onto successive single frames of a videotape. The encoded fields for each film unit would be interleaved on their respective videotape frames in a manner corresponding to the interleaving of the line scans within the film units.

Numerous other variations and alternate embodiments will also occur to those skilled in the art. Accordingly, it is intended that the invention be limited only in terms of the appended claims.

I claim;

1. A method of transferring to a video storage medium a motion picture which has been recorded as a series of still images on successive frames of a motion picture film comprising:
  (a) for each successive pair of film frames:
    (1) scanning a first field of lines on the first frame of the pair, and
    (2) scanning a second field of lines on the second frame of the pair which are positionally interleaved with respect to the first field of lines,
  (b) encoding the line scans into a video format, and
  (c) recording the encoded line scans for each pair of film frames onto a respective single frame of a video storage medium, with the first and second frames of encoded line scans for each pair of film frames interleaved on their respective video storage medium frame in a positional pattern corresponding to the relative interleaving of the line scans within the pair of film frames, each encoded field of film scans being recorded onto only one video storage medium frame, thereby compressing the number of video storage medium frames with respect to the number of film frames.

2. The method of claim 1, wherein said scanning is performed at a scanning station, and the motion picture film is advanced past the scanning station at a rate which is coordinated with the canning so that substantially every other line on each motion picture frame is scanned.

3. The method of claim 1, wherein the scanned and encoded fields of motion picture lines are recorded directly onto videotape without any intermediate accumulative storage of successive fields.

4. The method of claim 1 wherein, in addition to scanning a first field of lines on the first frame of each pair and a second field of lines on the second frame of each pair, a third field of lines positionally interleaved with the first field of lines is scanned on the first frame, a fourth field of lines positionally interleaved with the second field of lines is canned on the second frame, all of the scanned frames are accumulated in a storage device for a plural number of frame pairs, and only the first field of the first frame and the second field of the second frame are read out from said storage device for each pair of film frames and recorded on their respective videotape frame.

5. A method of transferring to a video storage medium a motion picture which has been recorded as a series of still images on successive frames of a motion picture film, comprising:
  (a) recording the motion picture film at twice the intended viewing speed,
  (b) for each successive pair of film frames:
    (1) scanning a first field of lines on the first frame of the pair, and
    (2) scanning a second field of lines on the second frame of the pair which are positionally interleaved with respect to the first field of lines,
  (c) encoding the line scans into a video format, and
  (d) recording the encoded line scans for said respective pairs of film frames onto successive single frames of a video storage medium, with the first and second frames of encoded line scans for each pair of film frames interleaved on their respective video storage medium frame in a manner corresponding to the relative interleaving of the line scans within the pair of film frames.

6. A method of transferring to a video storage medium a motion picture which has been recorded as a series of still images on successive frames of a motion picture film comprising:
  organizing said motion picture film into a plurality of successive film units, each film unit comprising a plurality of successive frames,
  scanning a first field of lines on one frame of each film unit.
  scanning at least one additional field of lines which are positionally interleaved with respect to the first field of lines on at least one other frame of each film unit.
  encoding the line scans into a video format, and
  recording the encoded line scans for said successive film unit onto respective single frames of a video storage medium, with the encoded line fields for each film unit interleaved on their respective video storage medium frame in a positional pattern corresponding to the relative interleaving of the line scans within the film unit, each encoded field of film scans being recorded onto only one video storage medium frame, thereby compressing the number of video storage medium frames with respect to the number of film frames.

7. The method of claim 6, wherein the film units include equal numbers of frames, sand scanning is performed at a scanning station, and the motion picture film is advanced past the scanning station at a rate which is corrdinated with the scanning so that the positions of the scanned lines for successive film frames vary periodically over a period equal to the length of a film unit.

8. The method of claim 6, wherein the scanned and encoded fields of motion picture lines are recorded directly onto videotape without any intermediate accumulative storage of successive fields.

9. The method of claim 6 wherein, in addition to scanning a first field of lines on one frame of each film unit and an additional field of lines on at least one other frame of each film unit, at least one further field of lines interleaved with the first field is scanned on the first frame and a similar number of fields are scanned on each of the other frames in the film unit, all of the scanned frames are accumulated in a storage device for a plural number of film units, and only said first and said additional fields of lines for each film unit are read out from the storage device and recorded on their respective videotape frame.

10. A method of transferring to a video storage medium a motion picture which has been recorded as a series of still images on successive frames of a motion picture film comprising:
  organizing said motion picture film into a plurality of successive film units, each film unit comprising a plurality of successive frames,
  recording the motion picture film at a speed equal to the intended viewing speed multiplied by the number of film frames per film unit,
  scanning a first field of lines within one frame of each film unit,
  scanning at least one additional field of lines which are positionally interleaved with respect to the first field of lines on at least one other frame of each film unit,
  encoding the line scans into a video format, and
  recording the encoded line scans for said successive film units onto respective single frames of a video storage medium, with encoded line fields for each film unit interleaved on their respective video storage medium frame in a manner corresponding to the relative interleaving of the line scans within the film unit.

* * * * *